(12) United States Patent
Aoyagi et al.

(10) Patent No.: US 10,940,619 B2
(45) Date of Patent: Mar. 9, 2021

(54) METHOD FOR MANUFACTURING THERMAL TRANSFER IMAGE-RECEIVING SHEET SUPPORT AND METHOD FOR MANUFACTURING THERMAL TRANSFER IMAGE-RECEIVING SHEET

(71) Applicant: Dai Nippon Printing Co., Ltd., Tokyo (JP)

(72) Inventors: Makoto Aoyagi, Tokyo (JP); Katsuyuki Hirano, Tokyo (JP); Toru Takahashi, Tokyo (JP); Munenori Ieshige, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 527 days.

(21) Appl. No.: 15/555,653

(22) PCT Filed: Mar. 22, 2016

(86) PCT No.: PCT/JP2016/058920
§ 371 (c)(1),
(2) Date: Sep. 5, 2017

(87) PCT Pub. No.: WO2016/152832
PCT Pub. Date: Sep. 29, 2016

(65) Prior Publication Data
US 2018/0043587 A1   Feb. 15, 2018

(30) Foreign Application Priority Data

Mar. 23, 2015 (JP) .............................. JP2015-059675
Mar. 16, 2016 (JP) .............................. JP2016-052520

(51) Int. Cl.
*B29C 43/30* (2006.01)
*B32B 5/18* (2006.01)
(Continued)

(52) U.S. Cl.
CPC ............ *B29C 43/305* (2013.01); *B29C 43/24* (2013.01); *B29C 43/46* (2013.01); *B29C 43/52* (2013.01);
(Continued)

(58) Field of Classification Search
None
See application file for complete search history.

(56) References Cited

U.S. PATENT DOCUMENTS

| 5,244,861 A | 9/1993 | Campbell et al. |
| 2006/0154820 A1 | 7/2006 | Kung et al. |

(Continued)

FOREIGN PATENT DOCUMENTS

| JP | 09-177000 A1 | 7/1997 |
| JP | 11-334225 A1 | 12/1999 |

(Continued)

OTHER PUBLICATIONS

Translation of JP-2007098926-A.*
(Continued)

*Primary Examiner* — Matthew J Daniels
*Assistant Examiner* — Asha A Thomas
(74) *Attorney, Agent, or Firm* — Burr & Brown, PLLC

(57) ABSTRACT

A method for manufacturing a thermal transfer image-receiving sheet support that can be used to obtain a thermal transfer image-receiving sheet that maintains its gloss and that has excellent handleability and high condition uniformity while preventing the formation of air bubbles in an adhesive layer. A resin is supplied to one side of a substrate, which is passed between a cooling roller A and a rubber roller A. A porous film is stacked on another side of the substrate through a resin, and the substrate is passed between a cooling roller B and a rubber roller B. The cooling rollers A and B have surfaces with a ten-point average roughness (Continued)

(Rz) of 5 to 30 μm and 0 to 20 μm, respectively. The rubber rollers A and B have a rubber hardness (durometer (Type A)) of 60 to 95 and 50 to 80, respectively.

8 Claims, 3 Drawing Sheets

(51) Int. Cl.
    *B41M 5/42* (2006.01)
    *B41M 5/41* (2006.01)
    *B41M 5/44* (2006.01)
    *B29C 43/24* (2006.01)
    *B29C 43/46* (2006.01)
    *B29C 43/52* (2006.01)
    *B32B 27/06* (2006.01)
    *B32B 27/08* (2006.01)
    *B41M 5/50* (2006.01)
    *B41M 5/52* (2006.01)

(52) U.S. Cl.
    CPC .............. *B32B 5/18* (2013.01); *B32B 27/065* (2013.01); *B32B 27/08* (2013.01); *B41M 5/41* (2013.01); *B41M 5/42* (2013.01); *B41M 5/44* (2013.01); *B41M 5/502* (2013.01); *B29C 2043/462* (2013.01); *B29K 2883/00* (2013.01); *B29K 2995/007* (2013.01); *B41M 5/529* (2013.01); *B41M 5/5254* (2013.01); *B41M 5/5263* (2013.01); *B41M 2205/02* (2013.01); *B41M 2205/32* (2013.01); *B41M 2205/36* (2013.01); *B41M 2205/38* (2013.01)

(56) References Cited

U.S. PATENT DOCUMENTS

| 2007/0140727 | A1* | 6/2007 | Miyamoto | G03G 21/0058 |
| | | | | 399/101 |
| 2008/0118676 | A1 | 5/2008 | Yamamoto et al. | |
| 2010/0079701 | A1* | 4/2010 | Murayama | G02B 5/0226 |
| | | | | 349/64 |
| 2011/0183088 | A1* | 7/2011 | Shimizu | B41M 3/06 |
| | | | | 428/32.39 |

FOREIGN PATENT DOCUMENTS

| JP | 2000-272253 A1 | 10/2000 |
| JP | 2005-326554 A1 | 11/2005 |
| JP | 2006-192684 A1 | 7/2006 |
| JP | 2006-240287 A1 | 9/2006 |
| JP | 2007098926 A * | 4/2007 |
| JP | 2011-016295 A1 | 1/2011 |

OTHER PUBLICATIONS

Herbert L. Weiss and Hisamitsu Hamada, "Coating & Laminating Machine," Kabushiki Kaisha Kako Gijutsu Kenkyukai, Feb. 29, 1996, pp. 27, 28 and 133-137.

International Search Report and Written Opinion (Application No. PCT/JP2016/058920) dated May 31, 2016.

German Office Action (Application No. 11 2016 001 376.0) dated Oct. 16, 2019 (with English translation).

* cited by examiner

METHOD FOR MANUFACTURING THERMAL TRANSFER IMAGE-RECEIVING SHEET SUPPORT AND METHOD FOR MANUFACTURING THERMAL TRANSFER IMAGE-RECEIVING SHEET

BACKGROUND OF THE INVENTION

1. Field of the Invention

The present invention relates to methods for manufacturing thermal transfer image-receiving sheet supports, and more specifically to a method for manufacturing a thermal transfer image-receiving sheet support by laminating a porous film on a substrate with a melt-extruded resin while passing the substrate and the porous film between a pair of rollers. The invention also relates to a method for manufacturing a thermal transfer image-receiving sheet by forming a colorant-receiving layer on the porous film layer of the thermal transfer image-receiving sheet support.

2. Description of Related Art

Recording medium supports manufactured by melt extrusion coating of at least one side of a support such as base paper with a thermoplastic resin are used after the application of other materials such as photographic emulsions and heat-sensitive materials. An important factor for achieving high-quality images on recording medium supports is the surface smoothness of the supports before the application of other materials such as emulsions. A typical method for manufacturing a recording medium support involves casting a thermoplastic resin molten at high temperature onto a surface of a moving sheet of base paper by extrusion coating and nipping the thermoplastic resin between a press roller coated with an elastic resin and a cooling roller through the base paper to coat the base paper with the thermoplastic resin.

There are known methods for improving the surface smoothness of a support manufactured by melt coating with a thermoplastic resin, including specifying the nip pressure, increasing the thickness of the thermoplastic resin layer, increasing the nip pressure during coating with the thermoplastic resin, and calendaring for increasing the smoothness of the base paper. However, the nipping of the support and the resin is affected by the surface profile of the support. Increasing the resin thickness is disadvantageous from a cost standpoint. Calendaring is disadvantageous from a cost standpoint because more equipment and steps are required. Furthermore, none of these conventional methods provides sufficient smoothness.

To solve these problems, there is proposed a method for manufacturing a recording medium support by coating at least one side of a support with a thermoplastic resin by melt extrusion coating. The support coated with the thermoplastic resin is passed through a clearance between a cooling roller and a press roller arranged at a distance larger than or equal to the thickness of the support to be coated but smaller than the thickness of the coated support (see PTL 1).

PTL 2 discloses a thermal transfer image-receiving sheet including a support sheet including a back layer, such as a polyethylene terephthalate (PET), polyethylene, or polypropylene layer, bonded to the back side of a sheet of paper; a heat-insulating layer bonded to the front side of the sheet of paper of the support sheet; and an intermediate layer and an image-receiving layer sequentially bonded to the outer side of the heat-insulating layer. The back layer is laminated on the paper, for example, by extrusion lamination (paragraphs 0020 and 0021).

PTL 1: Japanese Unexamined Patent Application Publication No. 9-177000
PTL 2: Japanese Unexamined Patent Application Publication No. 2006-192684

Thermal transfer image-receiving sheet supports manufactured by such conventional methods are unsatisfactory in terms of handleability, the prevention of air entrainment into the adhesive layer, and the gloss and condition uniformity of the resulting thermal transfer image-receiving sheets.

SUMMARY OF THE INVENTION

In view of the above background art, an object of the present invention is to provide a method for manufacturing a thermal transfer image-receiving sheet support that can be used to obtain a thermal transfer image-receiving sheet having excellent handleability and high condition uniformity while preventing air entrainment into an adhesive layer. Another object of the invention is to provide a method for manufacturing a thermal transfer image-receiving sheet using such a thermal transfer image-receiving sheet support.

After conducting extensive research, the inventors have found that, in a method for manufacturing a thermal transfer image-receiving sheet support including a step of passing a substrate and a melt-extruded first resin between a cooling roller A and a rubber roller A to form a first resin layer on one side of the substrate and a step of passing the substrate having the first resin layer formed thereon together with a porous film and a melt-extruded second resin between a cooling roller B and a rubber roller B to form a porous film layer on the other side of the substrate through a second resin layer, the foregoing objects can be achieved by controlling the surface roughness of each cooling roller and the rubber hardness of each rubber roller to particular ranges and, preferably, corona-treating the surface of the substrate before the lamination of the resin layer on the substrate.

The present invention is based on these findings.

A thermal transfer image-receiving sheet support to be manufactured by the method of the present invention comprises a first resin layer on one side of a substrate and a porous film layer on another side of the substrate through a second resin layer. The method comprises: a first step of supplying a first resin to one side of the substrate and passing the substrate between a cooling roller A and a rubber roller A to form the first resin layer; and a second step of stacking a porous film on another side of the substrate having the first resin layer formed thereon through a second resin and passing the substrate between a cooling roller B and a rubber roller B to form the second resin layer and the porous film layer, or the method comprises: a first step of stacking a porous film on one side of the substrate through a second resin and passing the substrate between a cooling roller B and a rubber roller B to form the second resin layer and the porous film layer; and a second step of supplying a first resin to another side of the substrate having the second resin layer and the porous film layer formed thereon and passing the substrate between a cooling roller A and a rubber roller A to form the first resin layer. The cooling roller A has a surface with a ten-point average roughness (Rz) of 5 to 30 µm, the cooling roller B has a surface with a ten-point average roughness (Rz) of 0 to 3.0 µm, the rubber roller A has a rubber hardness of 60 to 95 as measured with a durometer (Type A), and the rubber roller B has a rubber hardness of 50 to 80 as measured with a durometer (Type A).

The ten-point average roughness (Rz) is measured in accordance with JIS B 0660:1998. Durometer (Type A) measurements are made in accordance with JIS K 6253-3: 2012 at a measurement temperature of 23±2° C.

In one embodiment of the present invention, the first resin layer has a thickness of 10 to 50 μm, and the second resin layer has a thickness of 5 to 30 μm.

In one embodiment of the present invention, the porous film layer has a thickness of 10 to 100 μm.

In one embodiment of the present invention, the first resin layer is formed on one side of the substrate after corona treatment.

In one embodiment of the present invention, the second resin layer is formed on a side of the substrate on which the first resin layer is not formed after corona treatment.

In one embodiment of the present invention, the cooling roller A is in contact with the first resin layer, the rubber roller A is in contact with a side of the substrate on which the first resin layer is not formed, the cooling roller B is in contact with the porous film layer, and the rubber roller B is in contact with the first resin layer.

The method for manufacturing a thermal transfer image-receiving sheet of the present invention comprises forming a colorant-receiving layer on the porous film layer of the thermal transfer image-receiving sheet support manufactured by the method according to the present invention, through an intermediate layer.

In one embodiment of the present invention, the intermediate layer is a primer layer comprising a binder resin.

Advantageous Effects of Invention

For the thermal transfer image-receiving sheet support and the thermal transfer image-receiving sheet manufactured by the methods according to the present invention, the cooling roller A (12) has high surface roughness, and the rubber roller A (13) has high rubber hardness. This allows the first resin layer formed on one side of the substrate to have high surface roughness. Thus, the thermal transfer image-receiving sheet support and the thermal transfer image-receiving sheet have good handleability (i.e., the property of thermal transfer image-receiving sheet supports or thermal transfer image-receiving sheets being easily handled when stacked on top of each other since they tend not to adhere to each other).

According to the present invention, the cooling roller B (22), which is used to laminate the porous film on the other side of the substrate, has low surface roughness. This allows the laminated porous film to have a smooth surface and also improves the smoothness of the colorant-receiving layer formed on the porous film through an intermediate layer, which results in good gloss. In addition, the rubber roller B (23) has low rubber hardness. This prevents (or reduces; the same applies hereinafter) the entry of air bubbles into the second resin layer and also prevents the formation of creases and other appearance irregularities.

If the surface of the substrate is corona-treated before the formation of the first resin layer on one side of the substrate or the formation of the second resin layer on the other side of the substrate, the affinity between the substrate and the resin is improved. This increases the adhesion strength of the resin to the substrate and also facilitates uniform casting of the molten resin onto the surface of the substrate, thus improving the uniformity of the resin layer.

DETAILED DESCRIPTION OF THE INVENTION

Process for Manufacturing Thermal Transfer Image-Receiving Sheet Support and Thermal Transfer Image-Receiving Sheet FIGS. 1a to 1d illustrate an example method for manufacturing a thermal transfer image-receiving sheet support according to the present invention.

Figure 1A:
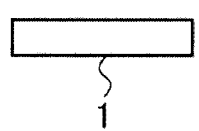
FIGS. 1a to 1d are schematic sectional views, taken in the thickness direction of a thermal transfer image-receiving sheet support, illustrating a method for manufacturing a thermal transfer image-receiving sheet support according to one embodiment of the present invention.
Figure 1B:
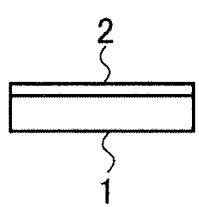
Figure 1C:
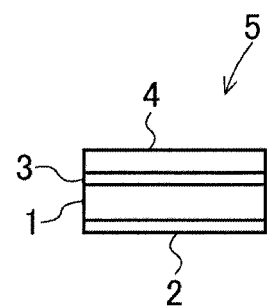

As shown in FIG. 1b, a first resin layer 2 is formed by adhesion on one side of a substrate 1 shown in FIG. 1a after corona treatment (which may be hereinafter referred to as "first step"). As shown in FIG. 1c, a porous film 4 is then laminated on the other side of the substrate 1 through a second resin layer 3 after corona treatment to manufacture a thermal transfer image-receiving sheet support 5 (which may be hereinafter referred to as "second step").

Figure 1D:
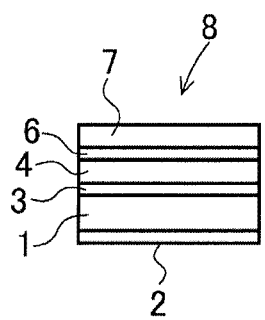

As shown in FIG. 1d, a colorant-receiving layer 7 is laminated on the porous film 4 of the thermal transfer image-receiving sheet support 5 through an intermediate layer 6 to manufacture a thermal transfer image-receiving sheet 8 (which may be hereinafter referred to as "third step").

In the second step, the surface of the first resin layer 2 (the surface facing away from the substrate 1) may be corona-treated. A writing layer (not shown) is provided on the corona-treated surface of the resin layer 2 in a different step.

First Embodiment

First Step

Figure 2:
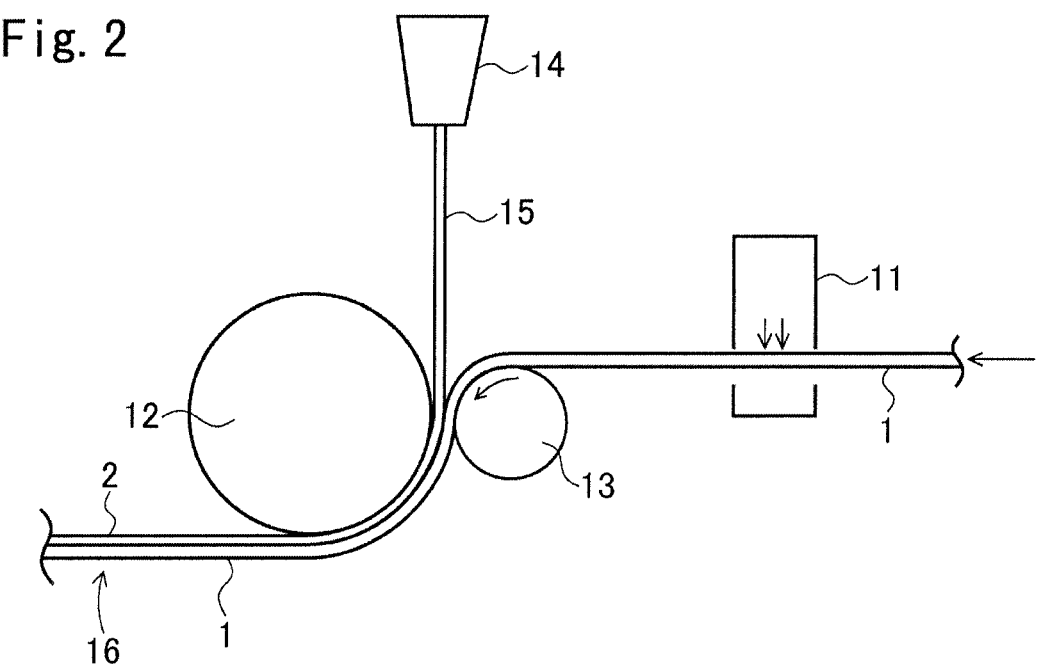
FIG. 2 is a schematic sectional view illustrating a first step of a method for manufacturing a thermal transfer image-receiving sheet support according to one embodiment of the present invention.

As shown in FIG. 2, in the first step of the first embodiment, while the substrate 1 is continuously fed by a feed mechanism (not shown), one side of the substrate 1 is corona-treated with a corona discharge treatment device 11, and the substrate 1 is then fed between a cooling roller (chill roller) A (12) and a rubber roller (press roller) A (13), with the one side facing the cooling roller A (12). A curtain of a first resin 15 melt-extruded from a die 14 is also supplied to the narrowest point between the cooling roller A (12) and the rubber roller A (13) or slightly closer to the rubber roller A (13) or the cooling roller A (12). The substrate 1 and the first resin 15 are stacked together and are passed between the cooling roller A (12) and the rubber roller A (13) while being held therebetween. Thus, a first laminate 16 composed of the substrate 1 and the first resin layer 2 formed by casting the resin 15 is obtained.

In this step, if the first resin 15 is melt-extruded such that the die 14 is located closer to the rubber roller A (13) or slightly (i.e., about 0 to 20 mm) closer to the cooling roller A (12) with respect to the narrowest point between the cooling roller A (12) and the rubber roller A (13), a thermal transfer image-receiving sheet support with good print texture and good adhesion between the substrate 1 and the first resin can be obtained.

Second Step

Figure 3:
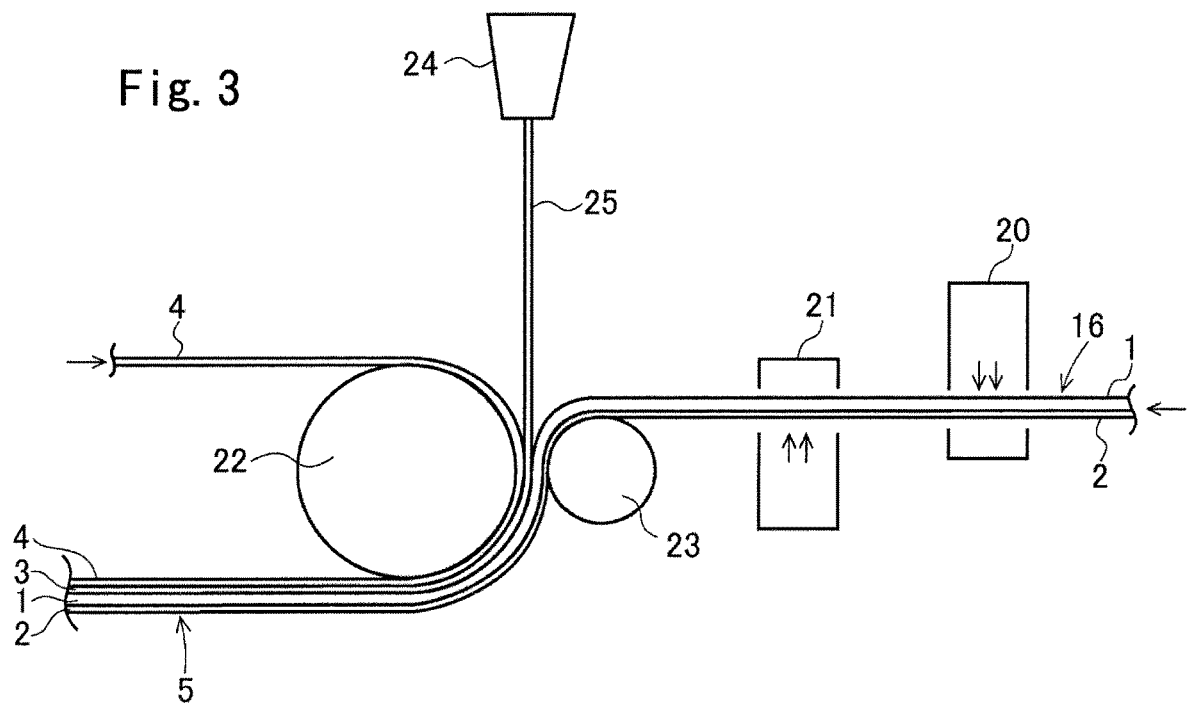
FIG. 3 is a schematic sectional view illustrating a second step of a method for manufacturing a thermal transfer image-receiving sheet support according to one embodiment of the present invention.

As shown in FIG. 3, in the second step of the first embodiment, while the first laminate 16 is continuously fed by a feed mechanism (not shown), the other side of the substrate 1 (the side facing away from the resin layer 2) is corona-treated with a corona discharge treatment device 20. The surface of the resin layer 2 (the surface facing away from the substrate 1) may also be corona-treated with a corona discharge treatment device 21. The first laminate 16 is then fed between a cooling roller (chill roller) B (22) and a rubber roller (press roller) B (23), with the first resin layer 2 facing the rubber roller B (23). A porous film 4 fed by a feed mechanism (not shown) is also supplied between the cooling roller B (22) and the rubber roller B (23). A curtain of a second resin 25 melt-extruded from a die 24 is further supplied between the porous film 4 and the substrate 1 of the first laminate 16. The porous film 4, the second resin 25, and the first laminate 16 are stacked together and are passed between the cooling roller B (22) and the rubber roller B (23) while being held therebetween. Thus, a thermal transfer image-receiving sheet support 5 composed of the first laminate 16, the second resin layer 3 formed by casting the second resin 25, and the porous film 4 is obtained.

In this step, if the second resin 25 is melt-extruded such that the die 24 is located slightly closer to the cooling roller B (22) with respect to the narrowest point between the cooling roller B (22) and the rubber roller B (23), a thermal transfer image-receiving sheet support with good print texture and good adhesion between the substrate 1 and the second resin can be obtained.

Third Step

In the third step of the first embodiment, the intermediate layer 6 is formed on the thermal transfer image-receiving sheet support 5 by coating, and the colorant-receiving layer 7 is formed on the intermediate layer 6 by coating to obtain the thermal transfer image-receiving sheet 8. Although not shown, a release layer may be provided on at least a portion of the outer surface of the colorant-receiving layer 7 (the surface facing away from the intermediate layer 6). As mentioned above, a writing layer may be provided through the first resin layer 2.

In the first embodiment, the thermal transfer image-receiving sheet 8 can also be obtained using a porous film 4 having the intermediate layer 6 and the colorant-receiving layer 7 formed thereon in advance by coating in the second step.

Second Embodiment

First Step

Figure 4:
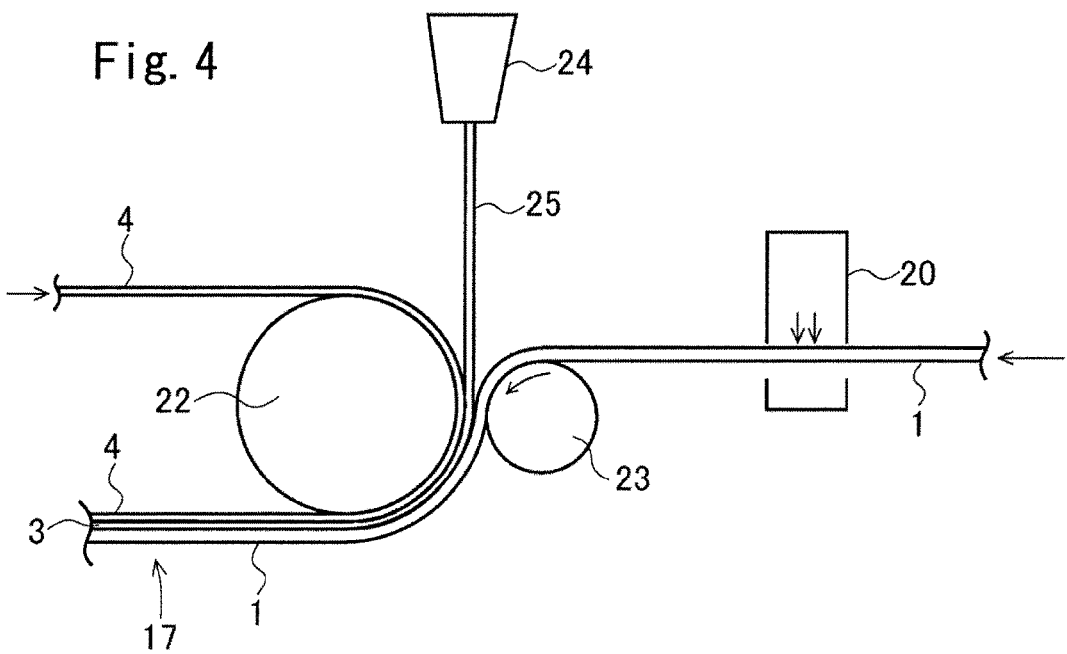
FIG. 4 is a schematic sectional view illustrating a first step of a method for manufacturing a thermal transfer image-receiving sheet support according to one embodiment of the present invention.

In the first step of the second embodiment, as shown in FIG. 4, while the substrate 1 is continuously fed by a feed mechanism, one side of the substrate 1 is corona-treated with a corona discharge treatment device 20, and the substrate 1 is then fed between a cooling roller (chill roller) B (22) and a rubber roller (press roller) B (23), with the one side facing the cooling roller B (22). A porous film 4 fed by a feed mechanism is also supplied between the cooling roller B (22) and the rubber roller B (23). A curtain of a second resin 25 melt-extruded from a die 24 is further supplied between the porous film 4 and the substrate 1. The porous film 4, the second resin 25, and the substrate 1 are stacked together and are passed between the cooling roller B (22) and the rubber roller B (23) while being held therebetween. Thus, a second laminate 17 composed of the substrate 1, the second resin layer 3 formed by casting the second resin 25, and the porous film 4 is obtained.

In this step, if the second resin 25 is melt-extruded such that the die 24 is located slightly (i.e., about 0 to 20 mm) closer to the cooling roller B (22) with respect to the narrowest point between the cooling roller B (22) and the rubber roller B (23), a thermal transfer image-receiving sheet support with good print texture and good adhesion between the substrate 1 and the second resin can be obtained.

Second Step

Figure 5:
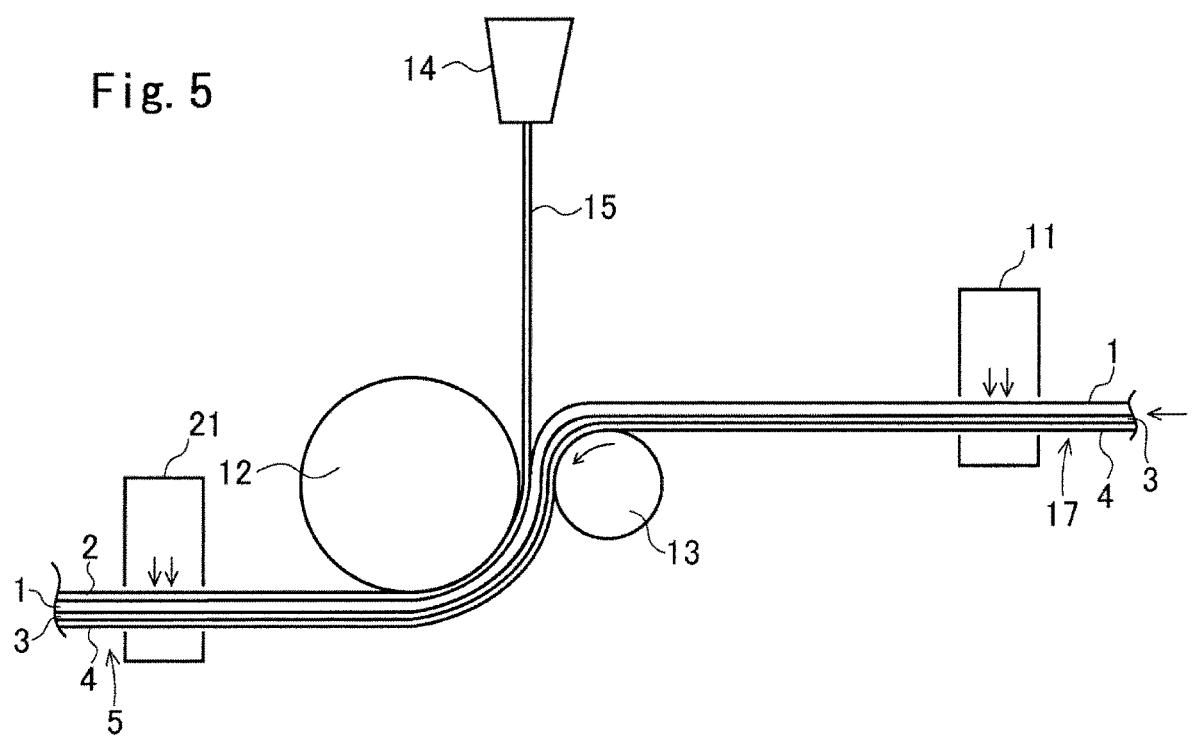
FIG. 5 is a schematic sectional view illustrating a second step of a method for manufacturing a thermal transfer image-receiving sheet support according to one embodiment of the present invention.

In the second step of the second embodiment, as shown in FIG. 5, while the second laminate 17 is continuously fed by a feed mechanism, the other side of the substrate 1 (the side facing away from the second resin layer 3) is corona-treated with a corona discharge treatment device 11, and the substrate 1 is then fed between a cooling roller (chill roller) A (12) and a rubber roller (press roller) A (13), with the other side facing the cooling roller A (12). A curtain of a first resin 15 melt-extruded from a die 14 is also supplied to the narrowest point between the cooling roller A (12) and the rubber roller A (13) or slightly closer to the rubber roller A (13) or the cooling roller A (12). The substrate 1 and the first resin 15 are stacked together and are passed between the cooling roller A (12) and the rubber roller A (13) while being held therebetween. Thus, a thermal transfer image-receiving sheet support 5 composed of the second laminate 17, the first resin layer 2 formed by casting the first resin 15, and the porous film 4 is obtained. The surface of the resin layer 2 (the surface facing away from the substrate 1) may also be corona-treated with a corona discharge treatment device 21.

In this step, if the first resin 15 is melt-extruded such that the die 14 is located slightly closer to the cooling roller A (12) with respect to the narrowest point between the cooling roller A (12) and the rubber roller A (13), a thermal transfer image-receiving sheet support with good print texture and good adhesion between the substrate 1 and the first resin can be obtained.

Third Step

In the third step of the second embodiment, the intermediate layer 6 is formed on the thermal transfer image-receiving sheet support 5 by coating, and the colorant-receiving layer 7 is formed on the intermediate layer 6 by coating to obtain the thermal transfer image-receiving sheet 8. Although not shown, a release layer may be provided on at least a portion of the outer surface of the colorant-receiving layer 7 (the surface facing away from the intermediate layer 6). As mentioned above, a writing layer may be provided through the first resin layer 2.

In the second embodiment, the thermal transfer image-receiving sheet 8 can also be obtained using a porous film 4 having the intermediate layer 6 and the colorant-receiving layer 7 formed thereon in advance by coating in the first step.

The thermal transfer image-receiving sheet 8 is then subjected to a trimming process in which the two edges parallel to the feed direction are removed by cutting. The strips left after cutting are preferably cut to a shorter length (e.g., several tens of centimeters or less) before being collected.

The preferred physical properties and other details of each roller will now be described in detail.

Cooling Roller A (12) and Rubber Roller A (13)

The cooling roller A (12), which is intended to cool a melt-extruded resin, is preferably formed of a metal. The cooling roller A (12) preferably has a temperature of about 10° C. to 40° C., more preferably about 25° C. to 30° C. The cooling roller A (12) preferably has a surface with a ten-point average roughness (Rz) of 5 to 30 μm, more preferably 10 to 20 μm. A lower surface roughness tends to result in the melt-extruded resin being wound around the cooling roller A (12) (i.e., resin transfer), which leads to poor process stability. A higher surface roughness tends to result in the formation of nonuniformities in the back side of the thermal transfer image-receiving sheet support 5.

The cooling roller A (12) preferably has a diameter of about 300 to 1,000 mm, more preferably about 400 to 800 mm.

The rubber roller A (13) preferably has a rubber hardness of 60 to 95, more preferably 80 to 90, as measured with a durometer (Type A). A lower value tends to result in uneven adhesion between the first resin and the substrate and also results in a lower wear resistance. The rubber roller A (13) preferably has a diameter of about 100 to 400 mm, more preferably about 200 to 300 mm.

The rubber roller A (13) is preferably conductive to prevent the adhesion of debris and foreign matter. Accordingly, the rubber roller A (13) is preferably formed of, for example, a rubber material mixed with a conductive material such as carbon.

This rubber roller preferably has release properties to prevent the adhesion of the first resin 15, which is generally melt-extruded over a wide area beyond the edges of the substrate 1 as a measure against resin swelling due to neck-in. Thus, preferred materials for the rubber roller include silicone rubbers (FMQ, FVMQ, MQ, PMQ, PVMQ, and VMQ, which have hardnesses of 30 to 90) and FKM (fluoroelastomer, which has a hardness of 50 to 90).

However, typical silicone rubbers have poor adhesion to roller cores. In addition, it is difficult to increase the hardness of silicone rubbers compared to common rubbers such as NBR (nitrile rubber, which has a hardness of 10 to 95), EPT (ethylene-propylene rubber, which has a hardness of 40 to 80), and SBR (styrene rubber, which has a hardness of 30 to 95). A preferred rubber roller structure is therefore as follows: roller core/common rubber/conductive silicone rubber.

The common rubber, such as NBR, EPT, CR (chloroprene rubber, which has a hardness of 30 to 85), IIR (butyl rubber, which has a hardness of 20 to 80), U (urethane rubber, which has a hardness of 10 to 95), or CSM (chlorosulfonated polyethylene, which has a hardness of 50 to 85), serving as the base for the silicone rubber preferably has a hardness higher than or equal to that of the silicone rubber. This increases the linear pressure in the nip between the rubber roller and the cooling roller. Thus, for example, preferred structures include one including a common rubber having a hardness of 95 and a conductive silicone rubber having a hardness of 90, one including a common rubber having a hardness of 95 and a conductive silicone rubber having a hardness of 85, one including a common rubber having a hardness of 90 and a conductive silicone rubber having a hardness of 85, and one including a common rubber having a hardness of 85 and a conductive silicone rubber having a hardness of 80.

These rubbers preferably have a thickness of about 10 to 30 μm, more preferably about 15 to 20 μm. A smaller thickness is preferred since it increases the linear pressure in the nip between the rubber roller and the cooling roller. An extremely small thickness, however, results in a reduced number of polishing operations for reconditioning.

The rubber roller A (13) has a surface roughness Ra (μm) of 0 to 5, preferably 0.01 to 3, more preferably 0.05 to 2. Ra is measured in accordance with JIS B 0601:2013. Rz (μm) is 0 to 30, preferably 0.05 to 20, more preferably 0.1 to 3.

As described above, the cooling roller A (12) has high surface roughness, and the rubber roller A (13) has high rubber hardness. This allows the surface of the first resin layer 2 (the surface facing away from the substrate 1) to have high surface roughness. Thus, the thermal transfer image-receiving sheet support 5 and the thermal transfer image-receiving sheet 8 have good handleability and also have good adhesion between the substrate 1 and the resin, which results in reduced unevenness. The preferred nip pressure between the cooling roller A (12) and the rubber roller A (13) is about 4 to 6 MPa, more preferably about 4.2 to 5 MPa. The preferred feed rate of the substrate in the first step is 20 to 300 m/min.

Cooling Roller B (22) and Rubber Roller B (23)

The cooling roller B (22) is preferably formed of a metal. The cooling roller B (22) preferably has a temperature of about 10° C. to 40° C., more preferably about 20° C. to 30° C. The cooling roller B (22) preferably has a surface with a ten-point average roughness (Rz) of 0 to 3.0 μm, more preferably 0.5 to 2.0 μm. A surface roughness of less than 0.5 μm tends to result in the melt-extruded resin being wound around the cooling roller B (22) (i.e., resin transfer), which leads to poor process stability. Nevertheless, the process stability can be improved by techniques such as extruding the resin at a width smaller than that of the porous film. A surface roughness of more than 3.0 μm tends to result in the formation of nonuniformities in the surface of the porous film. These nonuniformities are often observed as raised spots on the surface.

Since the cooling roller B (22) is used to laminate the porous film 4 on the surface, the second resin 25 is less likely to stick to the cooling roller B (22) than the first resin 15 is to the cooling roller A (12). Accordingly, the cooling roller B (22) has a lower roughness than the cooling roller A (12). This is also effective in improving the surface gloss of the thermal transfer image-receiving sheet.

The cooling roller B (22) preferably has a diameter of about 300 to 1,000 mm, more preferably about 400 to 800 mm.

The rubber roller B (23) preferably has a rubber hardness of 50 to 80, more preferably 60 to 70. The rubber roller B (23) preferably has a diameter of about 100 to 500 mm, more preferably about 200 to 400 mm.

The rubber roller B (23) has a surface roughness Ra (μm) of 0 to 5, preferably 0.01 to 3, more preferably 0.05 to 2. Rz (μm) is 0 to 30, preferably 0.05 to 20, more preferably 0.1 to 3.

As described above, the cooling roller B (22) has low surface roughness, and the rubber roller B (23) has low rubber hardness. This improves the surface smoothness of the porous film 4, prevents the entry of air bubbles into the second resin layer 3, and improves the uniformity of the second resin layer 3. The preferred nip pressure between the cooling roller B (22) and the rubber roller B (23) is about 2 to 4 MPa, more preferably about 2.5 to 3.5 MPa. The preferred feed rate of the substrate in the second step is 20 to 300 m/min.

The preferred compositions and physical properties of the substrate, the resins, and the porous film, the preferred conditions for corona treatment, and other details will now be described in detail.

Substrate

The substrate 1 for the thermal transfer image-receiving sheet is preferably formed of a material having sufficient mechanical strength in terms of handling in a heated state since heat is applied during thermal transfer. Preferred substrate materials include paper substrates. Both coated paper and uncoated paper may be used as paper substrates. For example, paper such as base paper, photographic paper, and wood-free paper may be used. For example, wood-free paper or art paper having a grammage of 78 to 400 g/m$^2$, preferably 100 to 200 g/m$^2$, may be used. In the present invention, the use of uncoated paper as the substrate reduces costs compared to the use of coated paper.

Preferably, but not necessarily, the substrate has a thickness of 50 to 300 μm, more preferably 100 to 250 μm, even more preferably 130 to 175 μm. The use of a substrate having a thickness within the above range improves the adhesion between the substrate and the porous film without collapse of the pores in the porous film and also improves the texture of a printed surface of the resulting thermal transfer image-receiving sheet.

The substrate has a surface roughness Ra (μm) of 0 to 10, preferably 0.1 to 5, more preferably 0.1 to 3. Rz (μm) is 0 to 50, preferably 0.1 to 30, more preferably 1 to 20.

First and Second Resin Layers

The second resin layer 3 of the thermal transfer image-receiving sheet is provided to bond the substrate 1 and the porous film 4 together. The first resin layer 2 is provided to adjust the curl balance of the thermal transfer image-receiving sheet. A writing layer may also be provided to allow writing. As described above, these resin layers are formed of the melt-extruded resins 15 and 25. These resins are preferably thermoplastic resins. Specific examples of thermoplastic resins include low-density polyethylene resins, medium-density polyethylene resins, high-density polyethylene resins, linear low-density polyethylene resins, ethylene-α-olefin copolymer resins obtained by polymerization with metallocene catalysts, ethylene-polypropylene copolymer resins, ethylene-vinyl acetate copolymer resins, ethylene-acrylic acid copolymer resins, ethylene-ethyl acrylate copolymer resins, ethylene-methacrylic acid copolymer resins, ethylene-methyl methacrylate copolymer resins, ethylene-maleic acid copolymer resins, ionomer resins, and resins obtained by graft polymerization or copolymerization of polyolefin resins with ester-forming monomers such as unsaturated carboxylic acids and unsaturated carboxylic anhydrides, such as those obtained by graft modification of polyolefin resins with maleic anhydride. These materials may be used alone or in combination.

In the present invention, the melt-extruded resins are preferably polyolefin resins having a melting point of 100° C. to 170° C. as measured in accordance with JIS K 7121. To improve the texture of a printed surface of the resulting thermal transfer image-receiving sheet and its handleability, the first resin 15 preferably has a melting point of 115° C. or higher, more preferably 118° C. to 167° C., and the second resin 25 preferably has a melting point of 105° C. or higher, more preferably 106° C. to 120° C. To improve the curl stability of a print and the texture of a printed surface, the polyolefin resin used for the first resin 15 preferably has a density of 0.89 to 0.97 g/cm$^3$, more preferably 0.930 to 0.965 g/cm$^3$, even more preferably 0.940 to 0.960 g/cm$^3$, as measured in accordance with JIS K 6760, and the polyolefin resin used for the second resin 25 preferably has a density of 0.89 to 0.93 g/cm$^3$, more preferably 0.90 to 0.93 g/cm$^3$, even more preferably 0.915 to 0.925 g/cm$^3$, as measured in accordance with JIS K 6760.

Mixtures of resins may also be used to achieve such melting points and densities.

The first resin layer 2 preferably has a thickness of 10 to 50 μm, more preferably 20 to 30 μm. The second resin layer 3 preferably has a thickness of 5 to 30 μm, more preferably 10 to 20 μm.

Porous Film

The porous film 4 is preferably a porous film containing a polypropylene resin as a base resin and having fine pores therein. The use of a porous film having a thickness approximately within the range shown below and containing a polypropylene resin to form a porous film layer improves the adhesion between the substrate and the porous film without collapse of the pores in the porous film and also improves the texture of a printed surface of the resulting thermal transfer image-receiving sheet.

The porous film 4 layer preferably has a thickness of 10 to 100 μm, more preferably 15 to 80 μm, even more preferably 20 to 50 μm. The porous film preferably has a density of 0.1 to 1.5 g/cm$^3$, more preferably 0.3 to 1.0 g/cm$^3$, as measured in accordance with JIS K 6922.

One technique for forming fine pores in a film is to prepare a compound by mixing the base resin for the film with fine organic or inorganic particles insoluble in the base resin (one or more types of particles may be used). As viewed microscopically, this compound has a fine domain-matrix structure formed by the base resin and the fine particles insoluble in the base resin. This compound is formed into a film and is stretched to cause delamination at the domain-matrix interface or large deformation of the domain-forming areas, thereby forming the fine pores as described above.

An example technique for forming fine pores is the addition of a polyester or acrylic resin, which has a higher melting point than polypropylene, to the polypropylene used as the base. In this case, the polyester or acrylic resin serves as a nucleating agent for forming fine pores. The polyester or acrylic resin is preferably present in an amount of 2 to 10 parts by mass based on 100 parts by mass of the polypropylene. If the polyester or acrylic resin is present in an amount of 2 parts by mass or more, a sufficient number of fine pores can be formed to improve the print sensitivity. If the polyester or acrylic resin is present in an amount of 10 parts by mass or less, sufficient heat resistance of the porous film can be ensured.

If a porous film containing polypropylene as a base resin is formed, it is preferred to add polyisoprene so that pores can be formed more finely and densely. This results in a higher print sensitivity. For example, a compound prepared by adding an acrylic resin or polyester and polyisoprene to the polypropylene used as the base can be formed into a film and be stretched to obtain a porous film having high print sensitivity.

Intermediate Layer

The intermediate layer 6 of the thermal transfer image-receiving sheet, which is disposed between the colorant-receiving layer 7 and the porous film 4, is intended to impart various properties such as adhesion between the colorant-receiving layer 7 and the porous film 4, whiteness, cushioning properties, concealing properties, antistatic properties, and curl resistance. Various primer layers may be provided as the intermediate layer 6. The binder resin used for the primer layer may be one or more of polyurethane resins, polyester resins, polycarbonate resins, polyamide resins, acrylic resins, polystyrene resins, polysulfone resins, polyvinyl chloride resins, polyvinyl acetate resins, vinyl chloride-vinyl acetate copolymer resins, polyvinyl acetal resins, polyvinyl butyral resins, polyvinyl alcohol resins, epoxy resins, cellulose resins, ethylene-vinyl acetate copolymer resins, polyethylene resins, polypropylene resins, and the like. Of these resins, those having active hydroxy groups may be cured with isocyanates for use as binders.

To impart whiteness and concealing properties, it is preferred to add fillers such as titanium oxide, zinc oxide, magnesium carbonate, and calcium carbonate. To increase the whiteness, compounds such as stilbene compounds, benzimidazole compounds, and benzoxazole compounds may be added as fluorescent brighteners. To increase the lightfastness of a print, compounds such as hindered amine compounds, hindered phenol compounds, benzotriazole compounds, and benzophenone compounds may be added as ultraviolet absorbers or antioxidants. To impart antistatic properties, compounds such as cationic acrylic resins, polyaniline resins, and various conductive fillers may be added. The dry coating weight of the primer layer is preferably about 0.5 to 5 g/m². The primer layer, for example, may be formed in the same manner as the colorant-receiving layer.

Colorant-Receiving Layer

The colorant-receiving layer 7 of the thermal transfer image-receiving sheet is intended to receive a sublimable dye transferred from a thermal transfer ink sheet and to retain the resulting image. The resin used to form the colorant-receiving layer 7 may be one or more of polycarbonate resins, polyester resins, polyamide resins, acrylic resins, cellulose resins, polysulfone resins, polyvinyl chloride resins, polyvinyl acetate resins, vinyl chloride-vinyl acetate copolymer resins, polyvinyl acetal resins, polyvinyl butyral resins, polyurethane resins, polystyrene resins, polypropylene resins, polyethylene resins, ethylene-vinyl acetate copolymer resins, epoxy resins, and the like.

The colorant-receiving layer 7 may contain a release agent to facilitate release from thermal transfer ink sheets. Examples of release agents include solid waxes such as polyethylene waxes, amide waxes, and fluoropolymer powders; fluorinated and phosphate surfactants; silicone oils and various modified silicone oils such as reactive silicone oils and curable silicone oils; and various silicone resins, with silicone oils being preferred. Although oily silicone oils may be used, modified silicone oils are preferred. Preferred modified silicone oils that can be used include amino-modified silicone oils, epoxy-modified silicone oils, aralkyl-modified silicone oils, epoxy-aralkyl-modified silicone oils, alcohol-modified silicone oils, vinyl-modified silicone oils, and urethane-modified silicone oils, more preferably epoxy-modified silicone oils, aralkyl-modified silicone oils, and epoxy-aralkyl-modified silicone oils. It is also preferred that two or more of these release agents be used in combination. These modified silicone oils are preferably added in an amount of 0.5% to 30% by mass of the resin forming the colorant-receiving layer.

In the formation of the colorant-receiving layer 7, pigments and fillers such as titanium oxide, zinc oxide, kaolin, clay, calcium carbonate, and fine silica powder may be added to improve the whiteness of the colorant-receiving layer and thereby increase the sharpness of a transferred image. Plasticizers such as phthalate compounds, sebacate compounds, and phosphate compounds may be added.

The colorant-receiving layer 7 may be formed by preparing a coating liquid by dissolving or dispersing a thermoplastic resin and other necessary additives such as release agents, plasticizers, fillers, crosslinking agents, curing agents, catalysts, thermal release agents, ultraviolet absorbers, antioxidants, and light stabilizers in an organic solvent or water, applying the coating liquid by a forming technique such as gravure printing, screen printing, or reverse roll coating using a gravure plate, and drying the coating. The dry coating weight of the thus-formed colorant-receiving layer is typically about 0.5 to 50 g/m², preferably 2 to 10 g/m². Although the colorant-receiving layer is preferably formed as a continuous coating, it may also be formed as a discontinuous coating.

Release Layer

The thermal transfer image-receiving sheet may further include a release layer on at least a portion of the surface of the colorant-receiving layer 7. The release layer may be formed by dissolving or dispersing the release agent described above in a suitable solvent, applying the solution or dispersion, and drying the coating. The release agent used for the release layer is preferably, but not limited to, a curing reaction product of an amino-modified silicone oil and an epoxy-modified silicone oil. The release layer preferably has a thickness of 0.01 to 5.0 µm, more preferably 0.05 to 2.0 µm. Alternatively, the release layer may be formed by forming the colorant-receiving layer using a silicone oil and curing the silicone oil bled out to the surface after the application.

Corona Treatment Conditions

If either side of the substrate 1 or the surface of the first resin layer 2 is treated with the corona discharge treatment device 11, 20, or 21, the corona treatment conditions are preferably set to about 5 to 50 W/m²·min, more preferably about 10 to 30 W/m²·min. If the corona treatment conditions are set to less than 5 W/m²·min, the corona treatment is not sufficiently effective in improving the adhesion of the resin. If the corona treatment conditions are set to more than 50 W/m²·min, corona discharge may be unstable.

Thermal Transfer Ink Sheet

The thermal transfer image-receiving sheet manufactured by the method according to the present invention is used with a thermal transfer ink sheet to form an image. The thermal transfer ink sheet preferably has a layer structure including a thermally transferable colorant layer on one side of a substrate sheet and a heat-resistant slipping layer on the other side of the substrate sheet. The layers forming the thermal transfer ink sheet will now be described.

Substrate Sheet

Conventionally known materials may be used for the substrate sheet forming the thermal transfer ink sheet. Other materials that have certain heat resistance and strength may also be used. Examples of such materials include resin films such as those of polyesters such as polyethylene terephthalate, polypropylene, polycarbonate, polyethylene, polystyrene, polyvinyl alcohol, polyvinyl chloride, polyvinylidene chloride, polyimide, nylon, cellulose acetate, and ionomers; paper such as condenser paper and paraffin paper; and nonwoven fabric. These may be used alone or may be used in any combination to form a laminate. Of these, polyethylene terephthalate, which is an inexpensive general-purpose plastic that can be formed into thin films, is preferred.

The thickness of the substrate sheet may be selected depending on the material to achieve, for example, suitable strength and heat resistance. Typically, the preferred thickness is about 0.5 to 50 µm, more preferably 1 to 20 µm, even more preferably 1 to 10 µm.

The substrate sheet may be surface-treated to improve the adhesion to adjacent layers. The surface treatment may be performed by known resin surface modification techniques such as corona discharge treatment, flame treatment, ozone treatment, ultraviolet treatment, radiation treatment, surface roughening treatment, chemical treatment, plasma treatment, and grafting treatment. These surface treatment techniques may be used alone or in combination.

The adhesion treatment on the substrate sheet may also be performed by forming an adhesive layer on the substrate sheet by coating. The adhesive layer may be formed, for example, from the following organic and inorganic materials. Examples of organic materials include polyester resins; polyacrylate resins; polyvinyl acetate resins; polyurethane resins; styrene-acrylate resins; polyacrylamide resins; polyamide resins; polyether resins; polystyrene resins; polyethylene resins; polypropylene resins; vinyl resins such as polyvinyl chloride resins, polyvinyl alcohol resins, polyvinylpyrrolidone, and modified derivatives thereof; and polyvinyl acetal resins such as polyvinyl acetoacetal and polyvinyl butyral. Examples of inorganic materials include ultrafine colloidal inorganic pigment particles such as silica (colloidal silica), alumina and alumina hydrates (e.g., alumina sol, colloidal alumina, cationic aluminum oxide and hydrates thereof, and pseudoboehmite), aluminum silicate, magnesium silicate, magnesium carbonate, magnesium oxide, and titanium oxide.

If a plastic film is manufactured by stretching, the surface treatment may be performed by applying a primer to an unstretched film before stretching.

Thermally Transferable Colorant Layer

The thermal transfer ink sheet includes a thermally transferable colorant layer on one side of the substrate sheet. If the thermal transfer ink sheet is a sublimation thermal transfer ink sheet, a layer containing a sublimable dye is formed as the thermally transferable colorant layer. If the thermal transfer ink sheet is a hot-melt thermal transfer ink sheet, a layer containing a hot-melt ink formed of a hot-melt composition containing a colorant is formed. A layer region containing a sublimable dye and a layer region containing a hot-melt ink formed of a hot-melt composition containing a colorant may be sequentially provided on a single continuous substrate sheet.

Conventionally known dyes may be used as materials for the thermally transferable colorant layer. Preferred dyes include those having good properties as printing materials, for example, those having sufficient coloring density and resistance to discoloration and fading due to factors such as light, heat, and temperature. Examples of such dyes include diarylmethane dyes; triarylmethane dyes; thiazole dyes; merocyanine dyes; pyrazolone dyes; methine dyes; indoaniline dyes; azomethine dyes such as acetophenoneazomethine, pyrazoloazomethine, imidazoleazomethine, imidazoazomethine, and pyridineazomethine dyes; xanthene dyes; oxazine dyes; cyanostyrene dyes such as dicyanostyrene and tricyanostyrene dyes; thiazine dyes; azine dyes; acridine dyes; azo dyes such as benzeneazo, pyridoneazo, thiopheneazo, isothiazoleazo, pyrroleazo, pyrazoleazo, imidazoleazo, thiadiazoleazo, triazoleazo, and disazo dyes; spiropyran dyes; indolinospiropyran dyes; fluoran dyes; rhodamine lactam dyes; naphthoquinone dyes; anthraquinone dyes; and quinophthalone dyes. Specific examples include red dyes such as Disperse Red 60, Disperse Violet 26, Ceres Red 7B, and Samaron Red F3BS; yellow dyes such as Disperse Yellow 231, PTY-52, and Macrolex Yellow 6G; and blue dyes such as Solvent Blue 63, Waxoline AP-FW, Foron Brilliant Blue S-R, MS Blue 100, and C.I. Solvent Blue 22. Dyes contained in commercially available ribbons used for sublimation thermal transfer may also be used.

Examples of binder resins for supporting the dye include cellulose resins such as ethylcellulose resins, hydroxyethylcellulose resins, ethylhydroxycellulose resins, methylcellulose resins, and cellulose acetate resins; vinyl resins such as polyvinyl alcohol resins, polyvinyl acetate resins, polyvinyl butyral resins, polyvinyl acetal resins, and polyvinylpyrrolidone; acrylic resins such as poly(meth)acrylate and poly(meth)acrylamide; polyurethane resins; polyamide resins; and polyester resins. Of these, resins such as cellulose, vinyl, acrylic, polyurethane, and polyester resins are preferred for reasons such as heat resistance and ease of dye transfer.

The thermally transferable colorant layer may be formed, for example, by the following method. The dye, the binder resin, and optionally additives such as a release agent are dissolved in a suitable organic solvent such as toluene or methyl ethyl ketone or are dispersed in water. The resulting coating liquid (solution or dispersion) for the thermally transferable colorant layer is applied to one side of the substrate sheet by a forming technique such as gravure printing, reverse roll coating using a gravure plate, or the use of a roll coater or bar coater, followed by drying. The thermally transferable colorant layer has a thickness of about 0.2 to 5.0 μm. The sublimable dye is preferably present in the thermally transferable colorant layer in an amount of 5% to 90% by mass, more preferably 5% to 70% by mass.

Protective Layer

The thermal transfer ink sheet may include a protective layer sequentially provided on the same side as the thermally transferable colorant layer. After the colorant is transferred to the thermal transfer image-receiving sheet, the protective layer may be transferred to cover the image, thereby protecting the image from factors such as light, gas, liquid, and friction. The protective layer may be provided with other layers such as adhesive layers, release layers, and undercoat layers.

Heat-Resistant Slipping Layer

The heat-resistant slipping layer is formed on the side of the substrate sheet facing away from the thermally transferable colorant layer.

The heat-resistant slipping layer is mainly formed of a heat-resistant resin. Examples of heat-resistant resins include, but not limited to, polyvinyl butyral resins, polyvinyl acetoacetal resins, polyester resins, vinyl chloride-vinyl acetate copolymer resins, polyether resins, polybutadiene resins, styrene-butadiene copolymer resins, acrylic polyols, polyurethane acrylates, polyester acrylates, polyether acrylates, epoxy acrylates, urethane and epoxy prepolymers, nitrocellulose resins, cellulose nitrate resins, cellulose acetate propionate resins, cellulose acetate butyrate resins, cellulose acetate hydrogen phthalate resins, cellulose acetate resins, aromatic polyamide resins, polyimide resins, polyamide-imide resins, polycarbonate resins, and chlorinated polyolefin resins.

In addition to the heat-resistant resin, the heat-resistant slipping layer may contain additives such as slip-imparting agents, crosslinking agents, release agents, organic powders, and inorganic powders.

The heat-resistant slipping layer may typically be formed by adding the heat-resistant resin and optionally a slip-imparting agent and other additives to a solvent, dissolving or dispersing the ingredients to prepare a coating liquid for the heat-resistant slipping layer, applying the coating liquid for the heat-resistant slipping layer to the substrate sheet, and drying the coating. The solvent used for the coating liquid for the heat-resistant slipping layer may be similar to the solvent used for the coating liquid for the thermally transferable colorant layer.

Examples of techniques for applying the coating liquid for the heat-resistant slipping layer include wire bar coating, gravure printing, screen printing, and reverse roll coating using gravure plates, with gravure coating being preferred. The dry coating weight of the coating liquid for the heat-resistant slipping layer is preferably 0.1 to 3 g/m$^2$, more preferably 1.5 g/m$^2$ or less.

Image-Forming Method

In an image-forming method using the thermal transfer image-receiving sheet manufactured by the method according to the present invention, an image can be formed by stacking a thermal transfer ink sheet containing a thermally diffusible colorant on the thermal transfer image-receiving sheet and heating the thermal transfer ink sheet in response to recording signals to transfer the thermally diffusible colorant from the thermal transfer ink sheet to the thermal transfer image-receiving sheet. In the present invention, an image can also be formed by high-speed printing. As used herein, "high-speed printing" refers to printing at 0.5 to 3.0 msec/line, where msec/line is the time (msec) required for a thermal printer to print one line.

Any known thermal transfer recording apparatus may be used for this image-forming method. In the present invention, commercially available thermal transfer recording apparatuses may be used. Examples of such apparatuses include sublimation thermal transfer printers (available from ALTECH ADS (model: MEGAPIXEL III) and DNP Fotolusio Co., Ltd. (model: DS40)).

EXAMPLES

The present invention is further illustrated by the following examples and comparative examples, although these examples should not be construed as limiting the invention.

Example 1

Manufacture of Thermal Transfer Image-Receiving Sheet Support

A paper substrate, namely, white base paper (uncoated paper with a thickness of 150 μm, available from Mitsubishi Paper Mills Limited), was provided as a substrate layer. A porous polypropylene film (with a thickness of 38 μm and a density of 0.7 g/cm$^3$) was provided as a porous film for forming a porous film layer.

A polyethylene resin (with a melting point of 120° C. as measured in accordance with JIS K 7121 and a density of 0.95 g/cm$^3$ as measured in accordance with JIS K 6760) was used as the first resin 15. A polyethylene resin (with a melting point of 107° C. as measured in accordance with JIS K 7121 and a density of 0.919 g/cm$^3$ as measured in accordance with JIS K 6760) was used as the second resin.

The resin temperature during die extrusion was 320° C. for both the first resin and the second resin.

A roller having a diameter of 600 mm and having a surface with a ten-point average roughness (Rz) of 16 μm was used as the cooling roller A (12), and the temperature was set to 28° C. A roller having a common rubber layer (with a rubber hardness of 85) and a conductive silicone rubber layer (with a rubber hardness of 80) was used as the rubber roller A (13). The nip pressure between the cooling roller A (12) and the rubber roller A (13) was set to 4.0 MPa.

A roller having a diameter of 600 mm and having a surface with a ten-point average roughness (Rz) of 1.7 μm was used as the cooling roller B (22), and the temperature was set to 28° C. A roller having a common rubber layer (with a rubber hardness of 70) and a conductive silicone rubber layer (with a rubber hardness of 70) was used as the rubber roller B (23). The nip pressure between the cooling roller B (22) and the rubber roller B (23) was set to 2.0 MPa.

The thermal transfer image-receiving sheet support 5 was manufactured by performing the first and second steps as shown in FIGS. 2 and 3, where the feed rate of the substrate was set to 80 m/min, and the corona treatment conditions were set to 20 W/m$^2$·min. The first resin layer 2 of the thermal transfer image-receiving sheet support 5 had a thickness of 30 μm, and the second resin layer 3 had a thickness of 15 μm.

Manufacture of Thermal Transfer Image-Receiving Sheet

A coating liquid, for a primer layer, having the following composition was then applied to the porous polypropylene film 4 of the resulting thermal transfer image-receiving sheet support 5 using a gravure coater such that the dry coating weight was 2 g/m$^2$ and was dried at 110° C. for one minute. A coating liquid, for a colorant-receiving layer, having the following composition was further applied using a gravure coater such that the dry coating weight was 4 g/m$^2$ and was dried at 110° C. for one minute. The intermediate layer 6 and the colorant-receiving layer 7 were thus formed to obtain the thermal transfer image-receiving sheet 8.

Composition of Coating Liquid for Primer Layer

Polyester resin (the trade name WR-905, available from The Nippon Synthetic Chemical Industry Co., Ltd.): 13.1 parts by mass Titanium oxide (the trade name TCA-888, available from Tohkem Products Corporation): 26.2 parts by mass Fluorescent brightener (benzimidazole derivative, the trade name Uvitex BAC, available from Ciba Specialty Chemicals Corporation): 0.39 part by mass Water/isopropyl alcohol (in a mass ratio of 2/1): 60 parts by mass Composition of Coating Liquid for Colorant-Receiving Layer Vinyl chloride-vinyl acetate copolymer (the trade name Solbin C, available from Nissin Chemical Industry Co., Ltd.): 60 parts by mass Epoxy-modified silicone oil (the trade name X-22-3000T, available from Shin-Etsu Chemical Co., Ltd.): 1.2 parts by mass Methylstyryl-modified silicone oil (the trade name 24-510, available from Shin-Etsu Chemical Co., Ltd.): 0.6 part by mass Methyl ethyl ketone/toluene (in a mass ratio of 1/1): 5 parts by mass Examples 2 to 8 and Comparative Examples 1 to 5

Thermal transfer image-receiving sheets were manufactured under the same conditions except that the ten-point average roughnesses (Rz) of the surfaces of the cooling roller A (12) and the cooling roller B (22) and the rubber hardnesses of the rubber roller B (13) and the rubber roller B (23) were as shown in Table 1, the corona treatment conditions were as shown in Table 1, and (i) to (iii) below were performed. The conditions for the corona discharge treatment devices 11, 20, and 21 were as shown in Table 1.

(i) In Examples 1 to 5 and 8 and Comparative Examples 1 to 5, thermal transfer image-receiving sheets were manufactured as in the first embodiment.

(ii) In Example 6, a porous film coated in advance with a primer layer and a colorant-receiving layer in that order with a gravure coater was used in the second step of the first embodiment.

(iii) In Example 7, a thermal transfer image-receiving sheet was manufactured as in the second embodiment.

Characteristic Evaluation

The thermal transfer image-receiving sheets manufactured in the examples and comparative examples were tested and evaluated for gloss, handleability, the presence or absence of air bubbles in the resin layer 3, the uniformity of the resin layer 3, and the surface smoothness of the porous film 4 layer as follows. The results are summarized in Table 1.

Handleability: A thermal transfer printer (DNP Fotolusio DS40) was used to print a nature image on 100 sheets. These 100 sheets were stacked on top of each other and were aligned by tapping them at one end on a desk.

Good: The sheets were easily aligned.
Poor: The sheets were not aligned.

Uniformity of First Resin Layer 2: The back sides of the thermal transfer image-receiving sheets were visually inspected for surface smoothness.

Excellent: A very uniform pattern was observed.
Good: A uniform pattern was observed.
Fair: A fairly uniform pattern was observed.
Poor: A nonuniform pattern was observed.

Presence or Absence of Air Bubbles in Second Resin Layer 3: The thermal transfer image-receiving sheets were inspected for creases and air entrainment when the porous film 4, the resin 25, and the first laminate 16 were stacked together and were passed between the cooling roller B (22) and the rubber roller B (23) while being held therebetween in the second step.

Good: The surface was uniform without creases or air entrainment.
Poor: Creases and air entrainment occurred.

Surface Smoothness of Porous Film Layer: The porous film layers of the resulting thermal transfer image-receiving sheets were visually evaluated for surface smoothness.

Good: The surface was uniform.
Poor: Raised spots appeared on the surface.

Discussion

As can be seen from FIG. 1, Examples 1 to 8 had excellent gloss and handleability, excellent uniformity of the resin layer 3, and excellent surface smoothness of the porous film layer without air bubbles in the resin layer 3. In contrast, in Comparative Example 1, nonuniformities occurred in the surface of the thermal transfer image-receiving sheet.

In Comparative Example 2, air entrainment and creases occurred during the second step.

In Comparative Example 3, the print handleability was insufficient.

In Comparative Example 4, raised spots appeared on the surface of the thermal transfer image-receiving sheet.

In Comparative Example 5, nonuniformities occurred in the surface of the thermal transfer image-receiving sheet.

Whereas the present invention has been described in detail with reference to particular embodiments, it will be apparent to those skilled in the art that various modifications may be made without departing from the spirit or scope of the invention.

The present application is based on Japanese Patent Application No. 2015-059675, filed on Mar. 23, 2015, and Japanese Patent Application No. 2016-052520, filed on Mar. 16, 2016, the entire contents of which are incorporated herein by reference.

REFERENCE SIGNS LIST 1 substrate
2 first resin layer
3 second resin layer
4 porous film
5 thermal transfer image-receiving sheet support
6 intermediate layer
7 colorant-receiving layer
8 thermal transfer image-receiving sheet

TABLE 1

| | Ten-point average roughness (Rz) of surface of cooling roller (μm) | | Rubber hardness of rubber roller | | | | | Surface of | | |
| --- | --- | --- | --- | --- | --- | --- | --- | --- | --- | --- |
| | | | Rubber roller A (13) | | Rubber roller B (23) | | | | | |
| | | | | Hardness of common rubber layer/hardness of conductive silicone rubber layer (reference) | | Hardness of common rubber layer/hardness of conductive silicone rubber layer (reference) | Corona treatment conditions (W/m² · min) | Handle-ability | Surface of first resin layer 2 not in contact with substrate Uniformity | Surface of second resin layer 3 facing porous film Presence or absence of air entrainment | Surface smoothness of porous film layer |
| | Cooling roller A (12) | Cooling roller B (22) | Roller Itself | | Roller Itself | | | | | | |
| Example 1 | 16 | 1.7 | 80 | 85/80 | 70 | 70/70 | 20 | Good | Excellent | Good | Good |
| Example 2 | 7 | 1.7 | 85 | 90/85 | 70 | 70/70 | 20 | Good | Excellent | Good | Good |
| Example 3 | 16 | 0.8 | 85 | 90/85 | 70 | 70/70 | 20 | Good | Excellent | Good | Good |
| Example 4 | 16 | 1.7 | 80 | 85/80 | 60 | 60/60 | 20 | Good | Good | Good | Good |
| Example 5 | 16 | 2.5 | 80 | 85/80 | 60 | 60/60 | 10 | Good | Good | Good | Good |
| Example 6 | 16 | 1.7 | 85 | 90/85 | 70 | 70/70 | 20 | Good | Excellent | Good | Good |
| Example 7 | 16 | 1.7 | 85 | 90/85 | 70 | 70/70 | 20 | Good | Excellent | Good | Good |
| Example 8 | 16 | 1.7 | 80 | 90/80 | 70 | 70/70 | 0 | Good | Fair | Good | Good |
| Comparative Example 1 | 16 | 2 | 55 | 55/55 | 70 | 70/70 | 20 | Good | Poor | Good | Good |
| Comparative Example 2 | 16 | 2 | 85 | 90/85 | 85 | 90/85 | 20 | Good | Excellent | Poor | Good |
| Comparative Example 3 | 2 | 2 | 85 | 90/85 | 70 | 70/70 | 20 | Poor | Excellent | Good | Good |
| Comparative Example 4 | 16 | 30 | 85 | 90/85 | 70 | 70/70 | 20 | Good | Excellent | Good | Poor |
| Comparative Example 5 | 16 | 2 | 55 | 60/55 | 70 | 70/70 | 20 | Good | Poor | Good | Good |

11, 20, 21 corona discharge treatment device
12, 22 cooling roller A, B
13, 23 rubber roller A, B
14, 24 die
15 first resin
16 first laminate
25 second resin

The invention claimed is:

1. A method for manufacturing a thermal transfer image-receiving sheet support comprising a first resin layer on a first side of a substrate and a porous film layer on an opposed second side of the substrate through a second resin layer, wherein the method comprises:
  a first step of supplying a first resin to the first side of the substrate and passing the substrate between a cooling roller A and a rubber roller A to form the first resin layer, and
  a second step of stacking a porous film on the second side of the substrate, not having the first resin layer formed thereon, through a second resin, and passing the substrate between a cooling roller B and a rubber roller B to form the second resin layer and the porous film layer; or
wherein the method comprises:
  a first step of stacking the porous film on the second side of the substrate through the second resin and passing the substrate between a cooling roller B and a rubber roller B to form the second resin layer and the porous film layer, and
  a second step of supplying the first resin to the first side of the substrate, not having the second resin layer and the porous film layer formed thereon, and passing the substrate between a cooling roller A and a rubber roller A to form the first resin layer,
wherein a surface of the cooling roller A has a ten-point average surface roughness (Rz) in a range of 5 to 30 μm,
wherein a surface of the cooling roller B has a ten-point average surface roughness (Rz) in a range of 0 to 3.0 μm,
wherein the rubber roller A has a rubber hardness in a range of 60 to 95, as measured with a durometer (Type A), and
wherein the rubber roller B has a rubber hardness in a range of 50 to 80, as measured with a durometer (Type A).

2. The method for manufacturing a thermal transfer image-receiving sheet support according to claim 1, wherein the first resin layer has a thickness in a range of 10 to 50 μm, and the second resin layer has a thickness in a range of 5 to 30 μm.

3. The method for manufacturing a thermal transfer image-receiving sheet support according to claim 1, wherein the porous film layer has a thickness in a range of 10 to 100 μm.

4. The method for manufacturing a thermal transfer image-receiving sheet support according to claim 1, wherein the first resin layer is formed on the first side of the substrate after performing a corona treatment.

5. The method for manufacturing a thermal transfer image-receiving sheet support according to claim 1, wherein the second resin layer is formed on the second side of the substrate, on which the first resin layer is not formed, after performing a corona treatment on the first side of the substrate.

6. The method for manufacturing a thermal transfer image-receiving sheet support according to claim 1, wherein the cooling roller A is in contact with the first resin layer,
  wherein the rubber roller A is in contact with the second side of the substrate, on which the first resin layer is not formed,
  wherein the cooling roller B is in contact with the porous film layer, and
  wherein the rubber roller B is in contact with the first resin layer.

7. A method a manufacturing a thermal transfer image-receiving sheet comprising the steps of:
  providing a thermal transfer image-receiving sheet support manufactured according to the method of claim 1; and
  further forming a colorant-receiving layer on the porous film layer of the thermal transfer image-receiving sheet support through an intermediate layer.

8. The method for manufacturing a thermal transfer image-receiving sheet according to claim 7, wherein the intermediate layer is a primer layer comprising a binder resin.

* * * * *